United States Patent
Lee et al.

(10) Patent No.: US 8,126,034 B2
(45) Date of Patent: Feb. 28, 2012

(54) METHOD FOR RANGING WITH ACCESS POINT AND REPEATER IN WIRELESS COMMUNICATION SYSTEM

(75) Inventors: Sook-Jin Lee, Daejeon (KR); Eun-Kyung Kim, Gyeonggi-do (KR); Kyung-Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 1156 days.

(21) Appl. No.: 11/927,659

(22) Filed: Oct. 29, 2007

(65) Prior Publication Data

US 2008/0130723 A1    Jun. 5, 2008

(30) Foreign Application Priority Data

Dec. 4, 2006   (KR) .................. 10-2006-0121422

(51) Int. Cl.
  *H04B 17/02*   (2006.01)
(52) U.S. Cl. .................. 375/213; 375/220; 375/211
(58) Field of Classification Search .................. 375/213, 375/220, 316
  See application file for complete search history.

(56) References Cited

U.S. PATENT DOCUMENTS

| | | | |
|---|---|---|---|
| 3,593,138 A * | 7/1971 | Dunn et al. | 375/211 |
| 6,466,162 B2 * | 10/2002 | Boman | 342/357.34 |
| 6,795,491 B2 * | 9/2004 | Fleming et al. | 375/213 |
| 7,299,063 B2 * | 11/2007 | Kurihara | 455/513 |
| 7,414,470 B2 * | 8/2008 | Okazaki | 330/149 |

(Continued)

FOREIGN PATENT DOCUMENTS

KR   1020030084243 A   11/2003

(Continued)

*Primary Examiner* — Khanh C Tran
*Assistant Examiner* — Qutbuddin Ghulamali
(74) *Attorney, Agent, or Firm* — Jefferson IP Law, LLP (57) ABSTRACT

The present invention relates to a mobile communication system, and more particularly, to a repeater and a ranging method using the repeater. In the mobile communication system including the repeater, a ranging operation is performed so that data are transmitted to a base station regardless of whether a mobile terminal is within a repeater area. Accordingly, it is determined whether a ranging code received through a ranging flag is directly received from the mobile terminal or if it is received through the repeater. When the ranging code is transmitted to the base station through the repeater, the ranging operation of the mobile terminal is performed.

11 Claims, 8 Drawing Sheets

U.S. PATENT DOCUMENTS

| | | | |
|---|---|---|---|
| 2004/0166873 A1* | 8/2004 | Simic et al. | 455/456.1 |
| 2005/0130672 A1* | 6/2005 | Dean et al. | 455/456.1 |
| 2008/0117854 A1* | 5/2008 | Saifullah et al. | 370/315 |
| 2008/0123608 A1* | 5/2008 | Edge et al. | 370/338 |

FOREIGN PATENT DOCUMENTS

| | | |
|---|---|---|
| KR | 10-2005-0025897 A | 3/2005 |
| KR | 10-2006-0063276 A | 6/2006 |
| KR | 10-2006-0063277 A | 6/2006 |
| KR | 1020060097496 A | 9/2006 |
| KR | 10-2007-0036004 A | 4/2007 |
| WO | 2006/062285 A1 | 6/2006 |
| WO | 2006/062286 A1 | 6/2006 |
| WO | 2007/037633 A1 | 4/2007 |

\* cited by examiner

FIG. 6

METHOD FOR RANGING WITH ACCESS POINT AND REPEATER IN WIRELESS COMMUNICATION SYSTEM

CROSS-REFERENCE TO RELATED APPLICATION

This application claims priority to and the benefit of Korean Patent Application No. 10-2006-0121422 filed in the Korean Intellectual Property Office on Dec. 4, 2006, the entire contents of which are incorporated herein by reference.

BACKGROUND OF THE INVENTION (a) Field of the Invention

The present invention relates to a mobile communication system, and more particularly, to a repeater and a ranging method using the repeater.

(b) Description of the Related Art

Generally, in a portable Internet system, which is one of mobile communication systems, a mobile terminal performs an initial ranging operation and a handover ranging operation to access a base station, using a repeater for increasing coverage and data throughput. When the initial ranging and handover ranging operations are performed, the mobile terminal performs a timing offset control operation and a power offset control operation between the mobile terminal and the base station.

In this case, since timing offset and power offset of the mobile terminal are established based on the base station even when the mobile terminal accesses the repeater, the mobile terminal may be disconnected from the repeater.

The above information disclosed in this Background section is only for enhancement of understanding of the background of the invention. Applicants have made no determination and make no assertion or admission as to whether or not any of the above information might qualify with regard to the present application as prior art that is already known in this country to a person of ordinary skill in the art.

SUMMARY OF THE INVENTION

The present invention has been made in an effort to provide a repeater for appropriately performing a ranging operation by a mobile terminal in a mobile communication system including the repeater, and a ranging method thereof.

According to an exemplary embodiment of the present invention, in a method for performing a ranging operation of a mobile terminal by using a repeater in a mobile communication system, an uplink frame including a ranging code for the mobile terminal, a second offset value generated by adding a first offset value of the mobile terminal to a previously stored offset, and a ranging index in which a repeater indication flag indicating that the mobile terminal passes the repeater is established is received from the repeater, the first offset value is extracted from the second offset value based on a previously stored third offset value for the repeater, and a ranging response message including the extracted first offset value is generated and the ranging response message is transmitted to the mobile terminal so that the mobile terminal performs the ranging operation to the repeater based on the first offset value.

According to another exemplary embodiment of the present invention, in a method for performing a ranging operation of a mobile terminal by using a repeater in a mobile communication system, an uplink frame including a ranging code for the ranging operation is received from the mobile terminal, a first offset value for the mobile terminal is measured by using the received ranging code, a second offset value is generated based on the measured first offset value, a repeater indication flag is established to a ranging index in the uplink frame, the uplink frame is updated so that the generated second offset value includes the established repeater indication flag, and the uplink frame is transmitted to a base station.

An exemplary repeater for performing a ranging operation of a mobile terminal in a mobile communication system according to an embodiment of the present invention includes an offset storage unit, an offset measuring/calculating unit, and a flag establishing unit. The offset storage unit stores an offset value measured by a base station, and the offset value is an offset value of the repeater that has performed initialization. The offset measuring/calculating unit measures an offset value of the mobile terminal based on a ranging code for the mobile terminal included in an uplink frame received from the mobile terminal, and adds the offset value stored in the offset storage unit to the measured offset value. The flag establishing unit establishes a repeater indication flag indicating that the mobile terminal has passed the repeater to a ranging index area included in the uplink frame.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Figure 1:
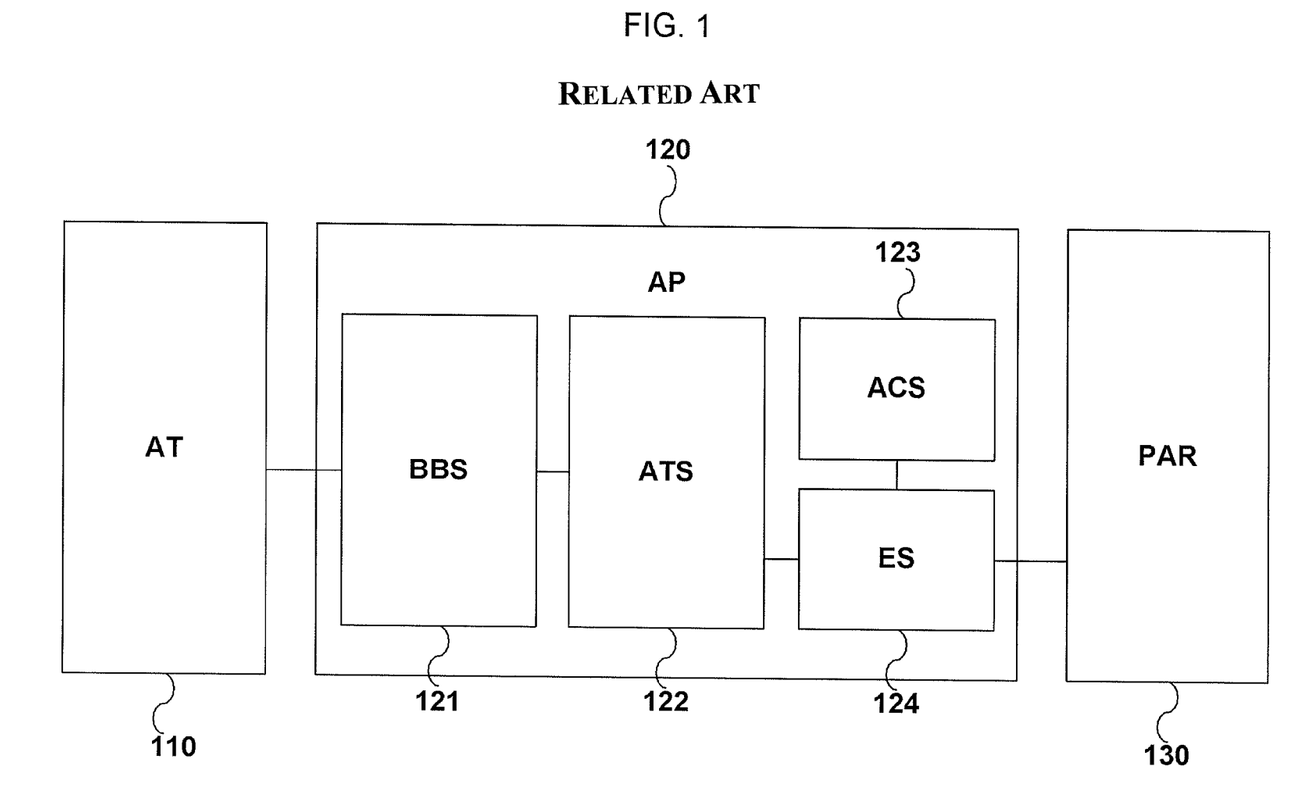
FIG. 1 is a schematic diagram of a conventional portable Internet system.

FIG. 1 is a schematic diagram of a conventional portable Internet system.

As shown in FIG. 1, in the conventional portable Internet system, an access point (AP) 120 is connected to an access terminal (AT) 110 and a packet access router (PAR) 130 for performing an external agent function.

The AP 120 includes a base band subsystem (BBS) 121, an access traffic subsystem (ATS) 122, an access controller subsystem (ACS) 123, and an Ethernet switch (ES) 124. The BBS 121 performs a wireless link transmitting/receiving function, and the ATS 122 performs a traffic process and wireless link transmitting/receiving control operation. The ACS 123 manages resources of each AT 110 and cells, and the Ethernet switch 124 reads an address from a data frame that may be transmitted from the AT 110 so that the data frame may be transmitted to the corresponding AT 110. The Ethernet switch 124 connects the PAR 130 to the ATS 122 and the ACS 123.

A conventional initial ranging process will now be described with reference to FIG. 2.

Figure 2:
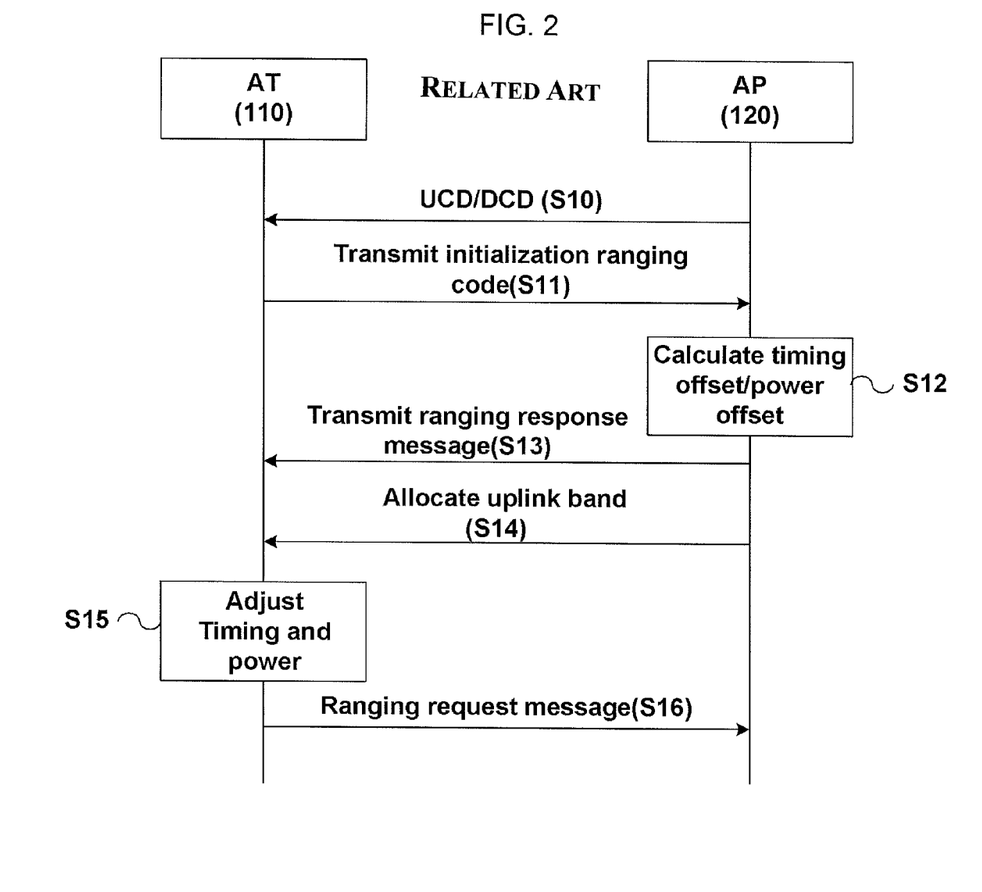
FIG. 2 is a flowchart representing a conventional initial ranging process.

FIG. 2 is a flowchart representing the conventional initial ranging process.

The initial ranging process is performed by a request from the AP 120 to obtain synchronization with the AT 110, and it is performed to set a frequent offset to a time offset between the AT 110 and the AP 120 and to control transmission power. That is, the AT 110 is turned on, receives a downlink map message DL-MAP, an uplink map message UL-MAP, and an uplink channel descriptor (UCD) message so that the base station obtains the synchronization, and performs the initial ranging process to control the frequent offset, the time offset, and the transmission power along with the AP 120.

As shown in FIG. 2, when system synchronization is obtained between the AT 110 and the AP 120 by turning on the AT 110, the AP 120 transmits the downlink map message to the AT 110 in step S10, and transmits the UCD message. Here, the UCD message includes information on a code division multiple access (CDMA) code (hereinafter, for convenience of description, referred to as a "ranging code"). Subsequently, the AP 120 transmits the uplink map message to the AT 110.

When the AT 110 receives the downlink map, uplink channel descriptor, and uplink map messages from the AP 120, the AT 110 may acknowledge a ranging code used to perform the initial ranging process, modulation scheme information, and coding scheme information that are received from the uplink channel descriptor message, and a ranging channel and a ranging slot received from the uplink map message. The AT 110 randomly selects a ranging code from the received ranging codes, randomly selects a ranging slot from the ranging slots used to perform the initial ranging process, and transmits the selected ranging code to the AP 120 through the selected ranging slot in step S11. In this case, the transmission power for transmitting the ranging code has a minimum transmission power level.

When receiving the ranging code from the AT 110 through a predetermined ranging slot, the AP 120 transmits a ranging response message RNG-RSP to the AT 110 in step S13. The ranging response message RNG-RSP informs that the ranging code is successfully received. Here, to include timing offset information and power offset information in the ranging response message, the AP 120 calculates the timing offset and the power offset in step S12 when receiving the initial ranging code, and adds a result thereof to the ranging response message.

The AP 120 transmitting the ranging response message transmits an uplink band allocation map message to the AT 110 receiving the ranging response message in step S14. Here, the uplink band allocation map message is uplink band allocation for a ranging request message RNG-REQ. The AT 110 receiving the uplink band allocation map message controls timing and power according to the timing offset and the power offset in step S15 when transmitting the ranging request message to the AP 120, and transmits the ranging request message to the AP 120 in step S16 when the timing and the power are controlled.

In this conventional ranging process, since the timing offset and the power offset of the AT 110 are established based on the AP 120 when the AT 110 tries to access the PAR 130, a disconnection between the AT 110 and the PAR 130 may occur. Accordingly, the PAR 130 according to the exemplary embodiment of the present invention performs a repeater ranging function with a ranging code value when the PAR 130 is initialized, so that the AT 110 is ranged on the PAR 130. A configuration of a mobile multi-hop relay (MMR) relay system will now be described with reference to FIG. 3. Here, the MMR system provides a communication function by using the repeater between access points.

Figure 3:
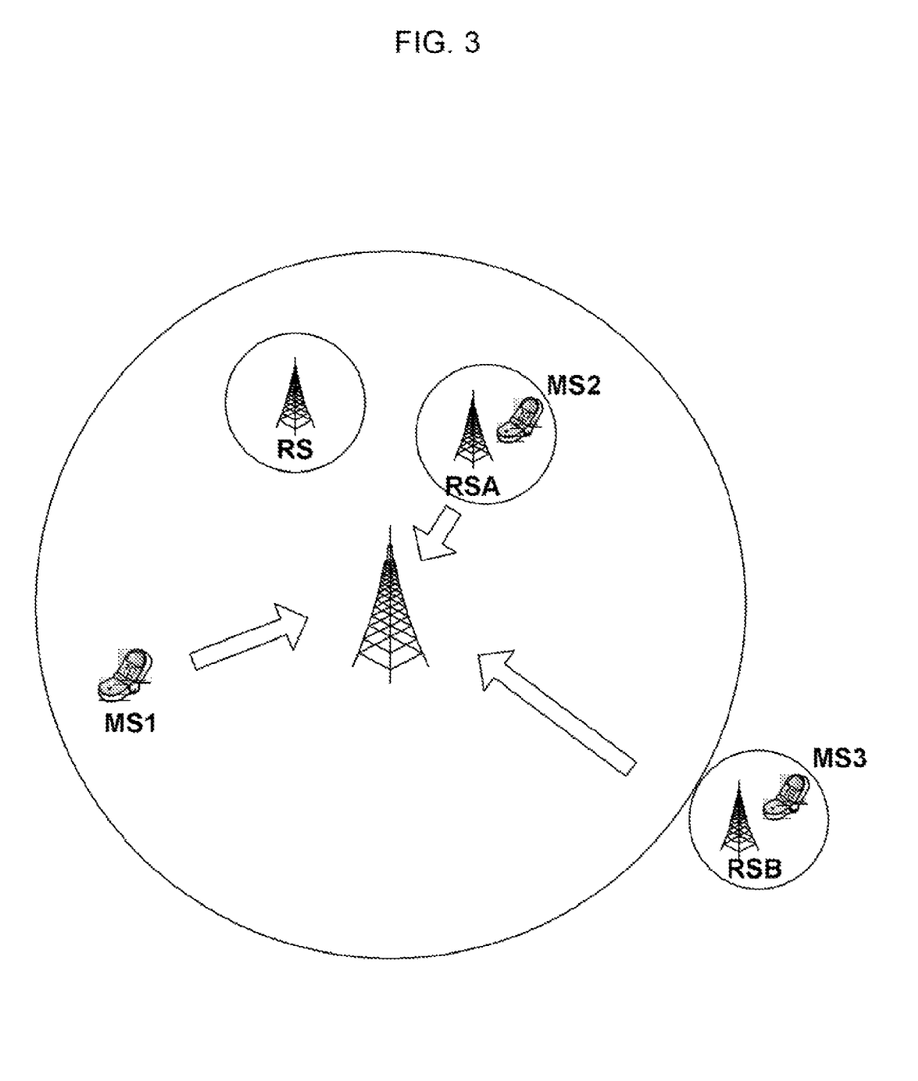
FIG. 3 is a configuration diagram of a mobile multi-hop relay (MMR) system according to an exemplary embodiment of the present invention.

FIG. 3 is a configuration diagram of the MMR system according to an exemplary embodiment of the present invention.

As shown in FIG. 3, the PAR 130 in the MMR (Mobile Multihop Relay) system according to the exemplary embodiment of the present invention performs a function for increasing a cell coverage area and managing the AT 110 in a coverage area of the PAR 130 to improve data throughput by simply performing a function of a repeater or an amplifier. In this case, coverage of a conventional MMR-base station (BS) is expanded by the PAR 130. When the AT 110 is positioned at a boundary area of the AP 120, traffic of the AT 110 may pass the PAR 130 or it may directly access the AP 120.

However, to improve coverage and throughput of the portable Internet system, the PAR 130 is required to efficiently transmit/receive data between the AP 120 and the AT 110 and manage a mobile state of the AT 110 in addition to amplifying wireless link data, so as to solve a problem in the conventional portable Internet system having no PAR 130 and to achieve improved performance.

Accordingly, in the exemplary embodiment of the present invention, a method for appropriately performing initial access and periodic ranging processes to transmit data to the AP 120 in the portable Internet system including a repeater regardless of whether a mobile terminal is within coverage of the repeater is suggested, and an improved frame configuration relating to a ranging code transmission method is suggested. The frame configuration will now be described with reference to FIG. 4. In the exemplary embodiment of the present invention, a one-hop configuration of the AP 120, PAR 130, and AT 110 that does not pass a plurality of PARs 130 will be described, but it is not limited thereto. A one-hop is a configuration required for one transmission when both terminals of the mobile communication system communicate with each other.

Figure 4:
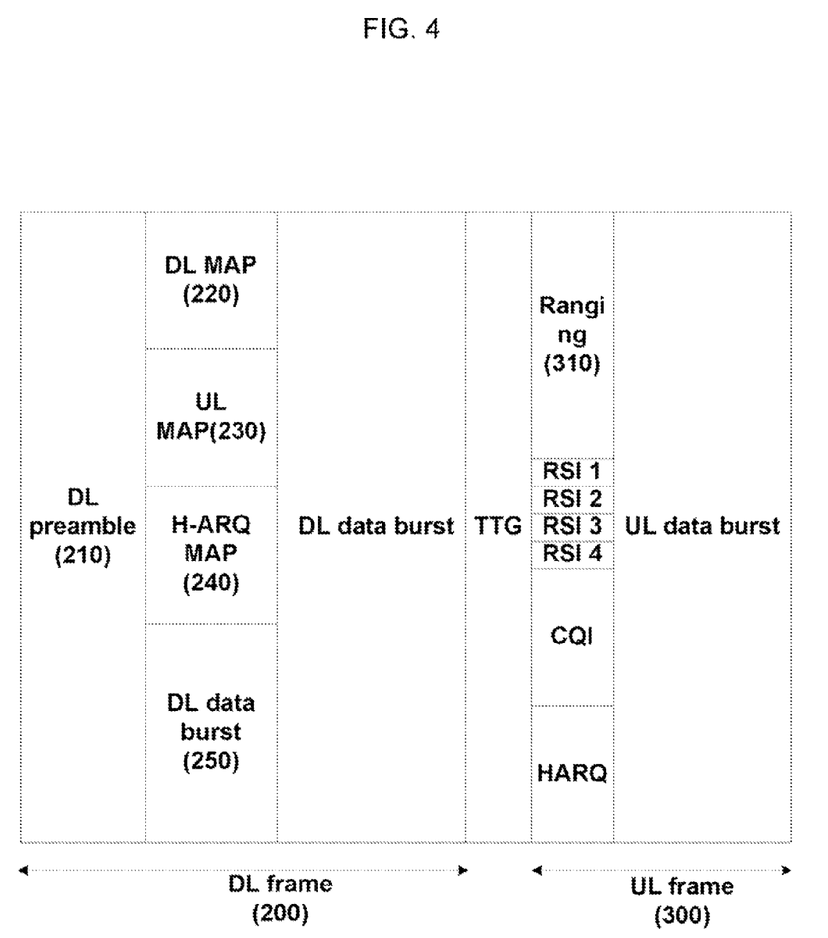
FIG. 4 is a diagram of a frame configuration according to an exemplary embodiment of the present invention.

FIG. 4 is a diagram of a frame configuration according to the exemplary embodiment of the present invention.

As shown in FIG. 4, the frame includes a downlink (DL) frame 200 transmitted from the AP 120 to the AT 110 and an uplink (UL) frame 300 transmitted from the AT 110 to the AP 120. The vertical axis of the frame represents a subchannel including orthogonal frequencies and the horizontal axis is a time-divided time axis.

The downlink frame 200 includes a preamble 210, a downlink mobile application part (MAP) 220, an uplink MAP 230, a hybrid automatic repeat request (H-ARQ) MAP 240, and a plurality of downlink bursts 250. The downlink bursts 250 are not formed by classifying channels or resources for each subscriber, but are classified according to each transmission level having the same modulation method or the same channel skill. Accordingly, the downlink MAP 220 uses a connection identifier (CID) to identify the AT 110 of a subscriber, and uses offset information, modulation method information, and coding information that correspond to the identified AT 110 to perform resource allocation for the AT 110.

Accordingly, the downlink MAP 220 and the uplink MAP 230 are used to transmit a location of a burst allocated for each subscriber and information that is commonly broadcasted to the ATs 110 of all the subscribers in the transmission frame. Therefore, the downlink MAP 220 has a broadcast channel characteristic, and it is required to have high robustness about noises.

In addition, in the uplink frame 300, transmission is performed for each subscriber, and a plurality of uplink bursts include information for each subscriber. Further, the uplink frame 300 includes a ranging subchannel 310 that is used to periodically report a state of the AT 110 to the AP 120. Here, the ranging subchannel includes a ranging information index field (RSI) of an area connected to former ranging information so as to indicate that the AT 110 passes the PAR 130.

The plurality of bursts included in the downlink frame 200 may be classified for each subscriber. The AT 110 transmits a control message and traffic information through the bursts. The downlink/uplink MAPs 220 and 230 are used to transmit the location of the burst allocated for each subscriber and the information that is commonly broadcasted to all subscribers in the transmission frame. In this case, all mobile terminals in the AP 120 may receive the downlink/uplink MAPs 220 and 230.

A conventional ranging operation using a repeater in the MMR system shown in FIG. 4 will be described with reference to FIG. 5 before describing repeater initialization according to the exemplary embodiment of the present invention.

Figure 5:
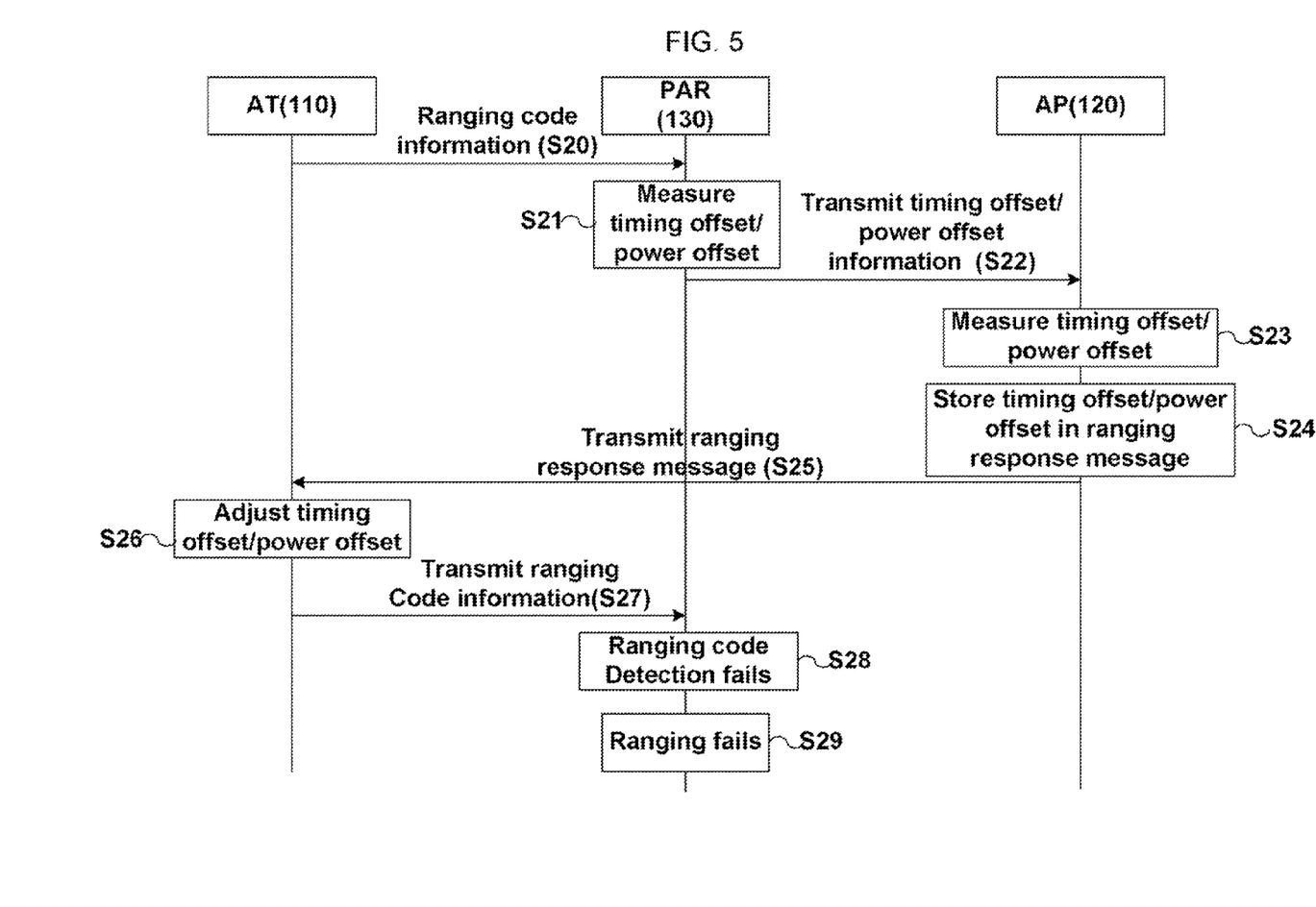
FIG. 5 is a flowchart representing a ranging message process in the conventional MMR system.

FIG. 5 is a flowchart representing a ranging message process in the conventional MMR system.

As shown in FIG. 5, the AT 110 transmits ranging code information to the PAR 130 in step S20. The PAR 130 measures the timing offset and the power offset in step S21, and transmits information including the measured timing and power offsets to the AP 120 in step S22.

When receiving the ranging code information from the PAR 130, the AP 120 measures the timing offset and the power offset that relate to a ranging code in step S23. In this case, the timing and power offsets measured by the AP 120 are values obtained by adding timing offsets and power offsets, respectively, that are measured by the PAR 130 and the AP 120.

The AP 120 stores the measured timing and power offsets in a ranging response message in step S24, and transmits the ranging response message to the AT 110 through the PAR 130 in step S25. The AT 110 analyzes the timing and power offsets extracted from the received ranging response message, adjusts the timing offset and the power offset in step S26, and transmits the ranging code information to the PAR 130 in step S27.

Since the ranging response message including the timing and power offsets adjusted by the AT 110 in step S26 is not within a ranging range, the PAR 130 may not detect the ranging code of the corresponding AT 110 in step S28. Therefore, the ranging for the ranging code of the PAR 130 fails in step S29.

An initialization method of the PAR 130 and a ranging method of the AP 120 are suggested in the exemplary embodiment of the present invention so as to not have the ranging operation performed by the AT 110 to the PAR 130 fail. The initialization method of the PAR 130 and the ranging method of the AP 120 will now be described with reference to FIG. 6 and FIG. 7.

Figure 6:
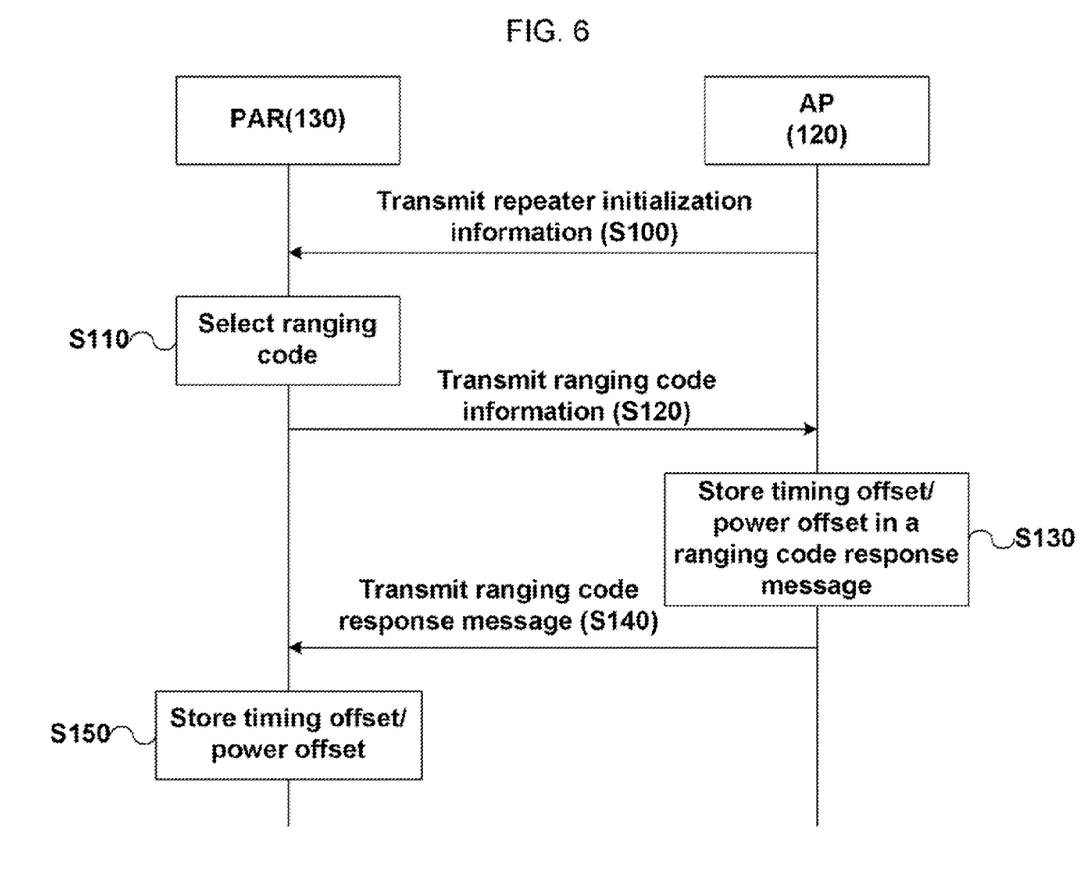
FIG. 6 is a flowchart representing a repeater initialization message process according to the exemplary embodiment of the present invention.

FIG. 6 is a flowchart representing a repeater initialization message process according to the exemplary embodiment of the present invention.

As shown in FIG. 6, when the PAR 130 transmits an initialization informing message to the AP 120, the AP 120 transmits a repeater initialization message msgRsInit_id to the PAR 130 in step S100. The repeater initialization message includes information for the initialization by the PAR 130, and information including a plurality of ranging codes that may be used by the PAR 130.

The PAR receiving the repeater initialization message randomly selects a ranging code from among a plurality of ranging codes in the repeater initialization message in step S110, and transmits information of the selected ranging code to the AP 120 in step S120. The AP 120 measures the timing offset and the power offset of the PAR 130 by using the ranging code received from the PAR 130, and stores a result value in step S130.

Subsequently, the AP 120 transmits a ranging code response message RS_CDMA_Code_Rsp including the stored timing and power offsets to the PAR 130 in step S140. The PAR 130 stores the timing offset and the power offset based on values included in the ranging code response message RS_CDMA_Code_Rsp received from the AP 120 in step S150, and therefore the initialization of the PAR 130 is finished.

When the initialization of the PAR 130 is finished as described in FIG. 6, the AT 110 performs the ranging operation through the PAR 130, which will be described with reference to FIG. 7.

Figure 7:
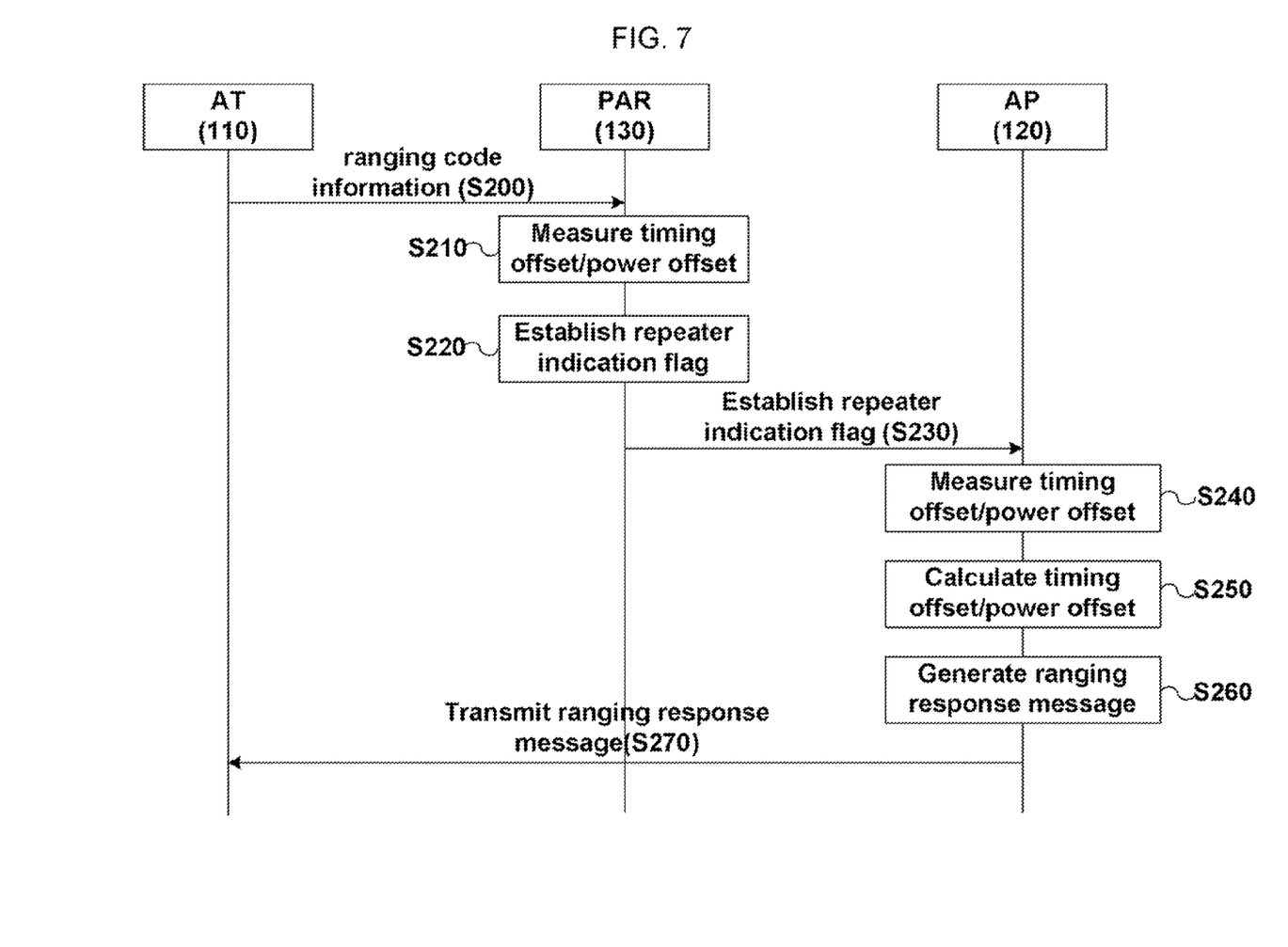
FIG. 7 is a flowchart representing an access point ranging process according to the exemplary embodiment of the present invention.

FIG. 7 is a flowchart representing an access point ranging process according to the exemplary embodiment of the present invention.

As shown in FIG. 7, the PAR 130 stores the same values as the timing offset and the power offset stored in the AP 120 according to the repeater initialization process shown in FIG. 6 in step S150. The AT 110 transmits a ranging code to the PAR 130 in step S200 to perform the ranging operation.

The PAR 130 uses the ranging code received from the AT 110 to measure the timing offset and the power offset in step S210. Here, a method for measuring the timing offset and the power offset has been disclosed in the prior art, and therefore detailed descriptions thereof will be omitted in the exemplary embodiment of the present invention.

The PAR 130 measuring the timing offset and the power offset for the AT 110 establishes a repeater indication flag RSIndicateFlag to a ranging index area of the uplink frame received from the AT 110 in step S220 to inform the AP 120 that the AT 110 passes the PAR 130. Here, the ranging index area is included in the uplink frame 300, and it includes information on the timing and power offsets measured by the PAR 130.

In this case, the information on the timing and power offsets included in the uplink frame 300 is a value obtained by adding the timing and power offset values measured by the PAR 130, after receiving the ranging code of the AT 110, to the timing and power offset values measured for the initialization of the PAR 130 and stored in the PAR 130. Subsequently, the PAR 130 transmits the uplink frame in which the repeater indication flag is established to the AP 120 in step S230.

The AP 120 receiving the uplink frame 300 from the PAR 130 measures the timing offset and the power offset corresponding to ranging code in step S240. In this case, the timing offset measured for the initialization of the PAR 130 is subtracted from the timing offset received from the PAR 130 in step S250. In addition, the power offset measured for the initialization of the PAR 130 is subtracted from the power offset received from the PAR 130 in step S250. The timing offset and the power offset measured for the initialization of the PAR 130 are subtracted to set timing between the PAR 130 and the AT 110.

The AP 120 generates a ranging response message including the calculated timing and power offsets in step S260, and transmits the ranging response message to the AT 110 through the PAR 130 in step S270. As described above, since the AP 120 provides the timing and power offsets measured by using initial values measured for the initialization of the PAR 130 to the ranging response message and transmits the ranging response message to the AT 110 through the PAR 130 when the corresponding ranging code passes the PAR 130, the AT 110 may perform the ranging operation to the PAR 130.

A configuration of the PAR 130 according to the exemplary embodiment of the present invention will be described with reference to FIG. 8.

Figure 8:
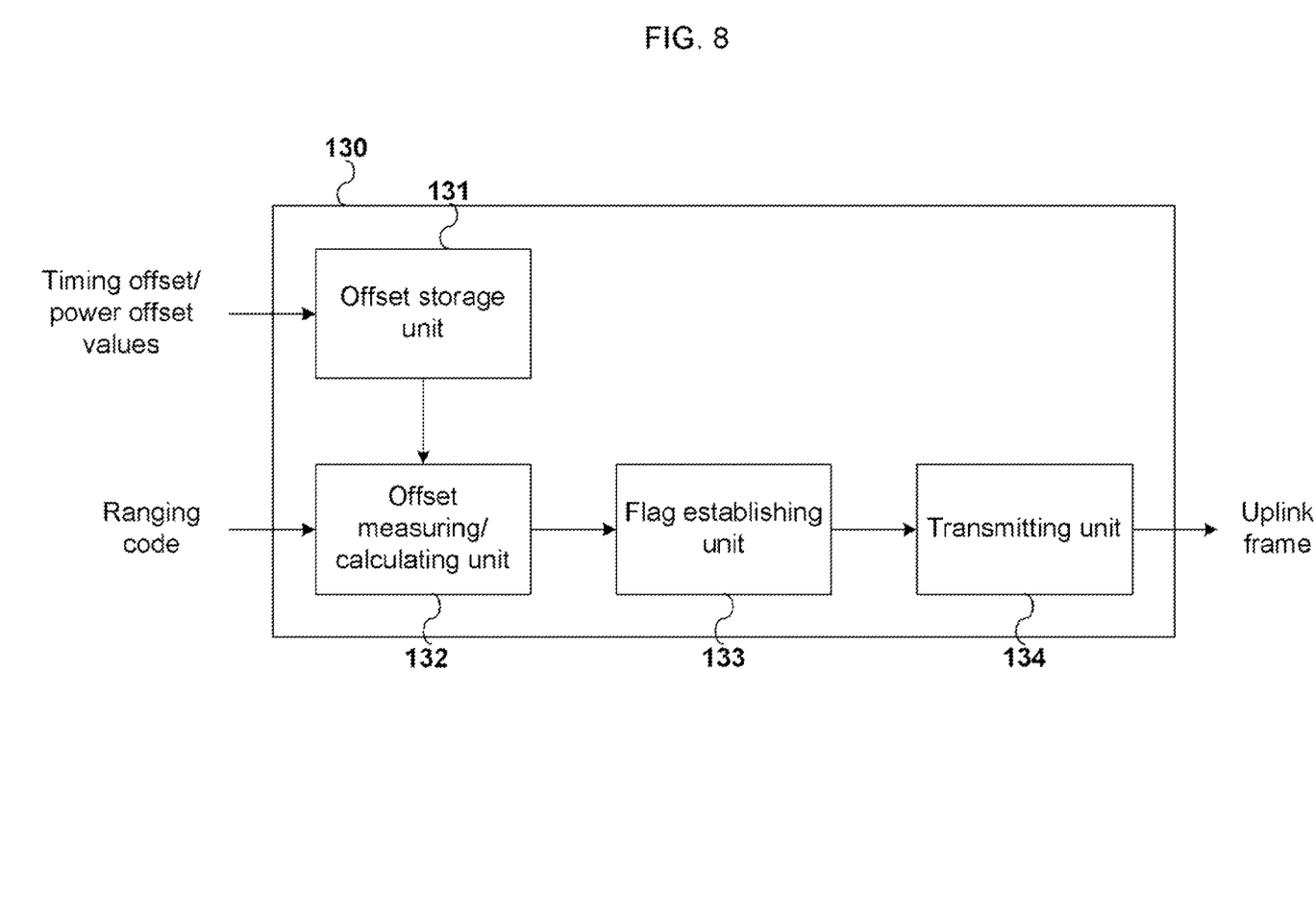
FIG. 8 is a diagram of a configuration of a repeater according to the exemplary embodiment of the present invention.

FIG. 8 is a diagram of a configuration of the PAR 130 according to the exemplary embodiment of the present invention.

As shown in FIG. 8, the PAR 130 includes an offset (timing adjust/power adjust, TA/PA) storage unit 131, an offset measuring/calculating unit 132, a flag establishing unit 133, and a transmitting unit 134.

The offset storage unit 131 receives the timing and power offsets for the PAR 130 that are measured by the AP 120 for the initialization of the PAR 130 from the AP 120, and stores the timing and power offsets. The offset measuring/calculating unit 132 adds the timing and power offsets for the AT that are measured by the PAR 130 receiving the ranging code from the AT 110 to the timing and power offsets stored in the offset storage unit 131, and outputs an added value.

The flag establishing unit 133 establishes the repeater indication flag in the uplink ranging index area to inform that the AT 110 accesses the AP 120 through the PAR 130. The transmitting unit 134 transmits the timing and power offsets of the AT calculated by the offset measuring/calculating unit 132 and the uplink frame including the repeater indication flag established by the flag establishing unit 133 to the AP 120.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, it may be determined whether the ranging information transmitted to the access point by establishing a ranging flag passes the repeater, and therefore an access terminal passing the repeater may efficiently perform a code ranging operation.

In addition, a ranging code loss caused by using the repeater may be prevented, and a call access rate and periodic ranging performance may be improved.

What is claimed is:

1. A method for performing a ranging operation of a mobile terminal by using a repeater in a mobile communication system, the method comprising:
   receiving an uplink frame from the repeater, the uplink frame including a ranging code for the mobile terminal, a second offset value generated by adding a first offset value of the mobile terminal to a previously stored offset, and a ranging index in which a repeater indication flag indicating that the mobile terminal passes the repeater is established;
   extracting the first offset value from the second offset value based on a previously stored third offset value for the repeater; and
   generating a ranging response message including the extracted first offset value and transmitting the ranging response message to the mobile terminal so that the mobile terminal performs the ranging operation to the repeater based on the first offset value.

2. The method of claim 1, wherein the third offset value is respectively stored in the repeater and a base station.

3. The method of claim 2, wherein the third offset value is generated by subtracting the first offset value from the second offset value.

4. The method of claim 1, wherein the first, second, and third offset values include timing offset and power offset.

5. The method of claim 2, further comprising, for the repeater:
   receiving a repeater initialization message from the base station, the repeater initialization message including information on the initialization of the repeater and a plurality of ranging codes that may be selected by the repeater;
   selecting one among the plurality of ranging codes and transmitting information on the selected ranging code to the base station;
   receiving a ranging code response message including an offset value measured by using the selected ranging code from the base station; and
   storing the measured offset value and performing the initialization.

6. A method for performing a ranging operation of a mobile terminal by using a repeater in a mobile communication system, the method comprising:
   receiving an uplink frame including a ranging code for the ranging operation from the mobile terminal;
   measuring a first offset value for the mobile terminal by using the received ranging code, and generating a second offset value based on the measured first offset value;
   establishing a repeater indication flag to a ranging index in the uplink frame; and
   updating the uplink frame so that the generated second offset value includes the established repeater indication flag, and transmitting the uplink frame to a base station.

7. The method of claim 6, wherein the second offset value is generated by adding an offset value for the repeater measured for initialization of the repeater to the first offset value.

8. The method of claim 7, further comprising, for the repeater:
   receiving a repeater initialization message from the base station, the repeater initialization message including information on the initialization of the repeater and a plurality of ranging codes that may be selected by the repeater;
   selecting one among the plurality of ranging codes and transmitting information on the selected ranging code to the base station;

receiving a ranging code response message including an offset value measured by using the selected ranging code from the base station; and storing the measured offset value and performing the initialization.

9. A repeater for performing a ranging operation of a mobile terminal in a mobile communication system, the repeater comprising:

an offset storage unit for storing an offset value measured by a base station, the offset value of the repeater having performed initialization;

an offset measuring/calculating unit for measuring an offset value of the mobile terminal based on a ranging code for the mobile terminal included in an uplink frame received from the mobile terminal, and adding the offset value stored in the offset storage unit to the measured offset value; and a flag establishing unit for establishing a repeater indication flag indicating that the mobile terminal passes the repeater to a ranging index area included in the uplink frame.

10. The repeater of claim 9, further comprising a transmitting unit for updating the uplink frame to include the offset value calculated by the offset measuring/calculating unit and the repeater indication flag established by the flag establishing unit and transmitting the uplink frame to the base station.

11. The repeater of claim 10, wherein the offset value includes a timing offset value and a power offset value.

* * * * *